(12) United States Patent
Kodama et al.

(10) Patent No.: US 7,956,852 B2
(45) Date of Patent: Jun. 7, 2011

(54) INFORMATION DISPLAY SYSTEM, INFORMATION DISPLAY APPARATUS, AND POSITION INDICATING APPARATUS

(75) Inventors: Yoshiyuki Kodama, Chino (JP); Junji Ajioka, Shiojiri (JP); Takeshi Ishikawa, Azumino (JP)

(73) Assignee: Seiko Epson Corporation (JP)

( * ) Notice: Subject to any disclaimer, the term of this patent is extended or adjusted under 35 U.S.C. 154(b) by 816 days.

(21) Appl. No.: 11/567,350

(22) Filed: Dec. 6, 2006

(65) Prior Publication Data

US 2007/0146387 A1    Jun. 28, 2007

(30) Foreign Application Priority Data

Dec. 7, 2005    (JP) ................................. 2005-353032

(51) Int. Cl.
*G06F 3/033*    (2006.01)
*G06F 3/041*    (2006.01)
(52) U.S. Cl. ..................... 345/179; 345/173; 178/19.01; 178/20.01
(58) Field of Classification Search .................. 345/179, 345/173; 178/19.01–20.04
See application file for complete search history.

(56) References Cited

U.S. PATENT DOCUMENTS

| | | | |
|---|---|---|---|
| 4,672,677 A * | 6/1987 | Yamakawa ..................... 382/185 |
| 5,629,499 A | 5/1997 | Flickinger et al. | |
| 7,158,675 B2 | 1/2007 | Gounares et al. | |
| 7,167,585 B2 | 1/2007 | Gounares et al. | |
| 2003/0076352 A1* | 4/2003 | Uhlig et al. .................... 345/738 |
| 2003/0112260 A1* | 6/2003 | Gouzu ........................... 345/716 |
| 2003/0116620 A1* | 6/2003 | Song .............................. 235/375 |
| 2003/0214531 A1 | 11/2003 | Chambers et al. | |
| 2003/0214553 A1 | 11/2003 | Dodge | |
| 2003/0215142 A1 | 11/2003 | Gounares et al. | |
| 2003/0217336 A1 | 11/2003 | Gounares et al. | |
| 2004/0049743 A1* | 3/2004 | Bogward ....................... 715/531 |
| 2006/0044288 A1* | 3/2006 | Nakamura et al. ............. 345/179 |
| 2006/0093219 A1 | 5/2006 | Gounares et al. | |

FOREIGN PATENT DOCUMENTS

| | | |
|---|---|---|
| JP | 07-200134 | 8/1995 |
| JP | 2001-311931 | 11/2001 |
| JP | 2003-511761 | 3/2003 |
| JP | 2004-030632 | 1/2004 |

* cited by examiner

*Primary Examiner* — Amr Awad
*Assistant Examiner* — Jonathan Boyd
(74) *Attorney, Agent, or Firm* — Harness, Dickey & Pierce, P.L.C.

(57) ABSTRACT

An information display system includes a position indicating apparatus that indicates a position and an information display apparatus that displays information and is connected to the position indicating apparatus so as to communicate with the position indicating apparatus. The position indicating apparatus includes: a detecting unit that detects an indicated position; a first storage unit that stores the detected position; and a transmitting unit that transmits positional information indicating the stored position. The information display apparatus includes: a display unit that displays content; a receiving unit that receives the transmitted positional information; an associating unit that associates the positional information with the content; and a second storage unit that stores the positional information and the content associated with each other.

21 Claims, 7 Drawing Sheets

INFORMATION DISPLAY SYSTEM, INFORMATION DISPLAY APPARATUS, AND POSITION INDICATING APPARATUS

BACKGROUND

1. Technical Field

The present invention relates to an information display system for displaying content, an information display apparatus, and a position indicating apparatus.

2. Related Art

Image display apparatuses provided with a display screen having a display storage property have been used. In the display screen, it is unnecessary to perform a redrawing operation, and thus no flicker occurs on the screen, which is easy on the user's eye and to obtain a high-quality image close to that on the pager. As a method of manually writing additional information to the content displayed on the display screen, the following method is disclosed in JP-A-2001-311931: a method of directly applying a voltage to an element on the display screen by using an electronic pen to change the display state of the element, thereby adding desired information.

However, the above-mentioned method has a problem in that the display state of the element on the display screen is changed by the electronic pen, but it is difficult to reflect handwritten information to content data, which makes it difficult to store the handwritten information so as to correspond to the displayed content. In additions since an image display device always monitors the voltage input from the electronic pen, the image display device consumes a large amount of power even in a standby state.

SUMMARY

An advantage of some aspects of the invention is that it provides an information display system capable of storing handwritten information so as to correspond to a predetermined page having content being currently displayed thereon.

According to an aspect of the invention, an information display system includes a position indicating apparatus that indicates a position; and an information display apparatus that displays information and is connected to the position indicating apparatus so as to communicate with the position indicating apparatus. The position indicating apparatus includes: a detecting unit that detects an indicated position; a first storage unit that stores the detected position; and a transmitting unit that transmits positional information indicating the stored position. The information display apparatus includes: a display unit that displays content; a receiving unit that receives the transmitted positional information; an associating unit that associates the positional information with the content; and a second storage unit that stores the positional information and the content associated with each other.

According to the above-mentioned structure, when a user draws a character with the position indicating apparatus, the position indicating apparatus transmits positional information corresponding to the drawn character to the information display apparatus. Then, the information display apparatus having receiving the positional information stores the content currently being displayed and the positional information such that the content and the positional information are associated with each other, which makes it possible to store the positional information so as to correspond to content. In addition, since the position indicating apparatus can store an indicated position, the position indicating apparatus can collectively transmit positional information to the information display apparatus at a predetermined timing. Therefore, it is unnecessary for the information display to always monitor positional information transmitted from the position indicating apparatus, resulting in a reduction in the power consumption of the information display apparatus.

According to another aspect of the invention, an information display apparatus includes: a display unit that displays content; a receiving unit that receives positional information representing an indicated position; an associating unit that associates the positional information with the content; and a storage unit that stores the positional information and the content associated with each other.

According to the above-mentioned aspect of the invention, the information display apparatus having received the positional information representing the indicated position stores the displayed content and the positional information such that they are associated with each other. Therefore, it is possible to store the positional information so as to correspond to the content.

In the information display apparatus according to the above-mentioned aspect, preferably, the display unit has a storage property that holds displayed content when the supply of power is cut off.

According to the above-mentioned structure, the displayed content is held without power consumption, which makes it possible to reduce the power consumption of the information display apparatus.

In the information display apparatus according to the above-mentioned aspect, preferably, the display unit displays the content on each page, and the associating unit associates the one page with at least one positional information item.

According to the above-mentioned structure, it is possible to associates one content page with a plurality of positional information items.

In the information display apparatus according to the above-mentioned aspect, preferably, the display unit displays the positional information associated with the one page on the next page of the one page.

According to the above-mentioned structure, the display unit can display the positional information associated with the one page on the next page of the one page.

In the information display apparatus according to the above-mentioned aspect, preferably, the display unit displays a plurality of positional information items. In addition, preferably, the display unit readably displays the positional information item associated with the one page among the plurality of positional information items, and displays the other positional information items in a light color or a small size.

According to the above-mentioned structure, among a plurality of positional information items displayed by the display unit, the same positional information is highlighted on the associated page.

In the information display apparatus according to the above-mentioned aspect, preferably, the trace of the indicated position is time-serially indicated in the positional information.

in the information display apparatus according to the above-mentioned aspect, preferably, the display unit displays together with the one page the existence or nonexistence of the positional information associated with the displayed one content page.

According to the above-mentioned structure, it is possible to easily check whether the positional information associated with the one content page displayed on the display unit exists.

According to still another aspect of the invention, a position indicating apparatus includes: a detecting unit that detects an indicated position; a storage unit that stores the detected position; and a transmitting unit that transmits positional information indicating the stored position.

According to the above-mentioned aspect, when a user draws a character with the position indicating apparatus, positional information corresponding to the drawn character is stored, and the stored positional information is collectively transmitted to the outside. Therefore, an apparatus for receiving the transmitted positional information can effectively acquire information on the trace of the position indicating apparatus.

In the position indicating apparatus according to the above-mentioned aspect, preferably, the detecting unit includes: a code reading unit that reads a code corresponding to the indicated position; and a positional information acquiring unit that acquires information on the indicated position from the read code.

According to the above-mentioned structure, it is possible to read a code corresponding to an indicated position and acquire the indicated position from the code.

In the position indicating apparatus according to the above-mentioned aspect, preferably, the detecting unit further includes a contact detecting unit that detects contact with a medium having the code arranged thereon, and the code reading unit receives information on the detection of the contact to start the reading operation.

According to the above-mentioned structure, the contact detecting unit detects contact with a medium, and the code reading unit starts to read a code. Therefore, it is possible to effectively read a code.

In the position indicating apparatus according to the above-mentioned aspect, preferably, the code reading unit further reads a code instructing the transmission of the positional information, and the transmitting unit receives the code instructing the transmission of the positional information and starts to transmit the positional information.

According to the above-mentioned structure, the transmitting unit receives the code instructing the transmission of the positional information and starts to transmit the positional information. Therefore, it is possible to effectively transmit the positional information.

In the position indicating apparatus according to the above-mentioned aspect, preferably, the code includes information uniquely corresponding to the indicated position in plan view.

BRIEF DESCRIPTION OF THE DRAWINGS

The invention will be described with reference to the accompanying drawings, wherein like numbers refer like elements.

DESCRIPTION OF EXEMPLARY EMBODIMENTS

Hereinafter, an information display system 1, which is a portable electronic apparatus system, according to an embodiment of the invention will be described with reference to the accompanying drawings.

Embodiments

Figure 1:
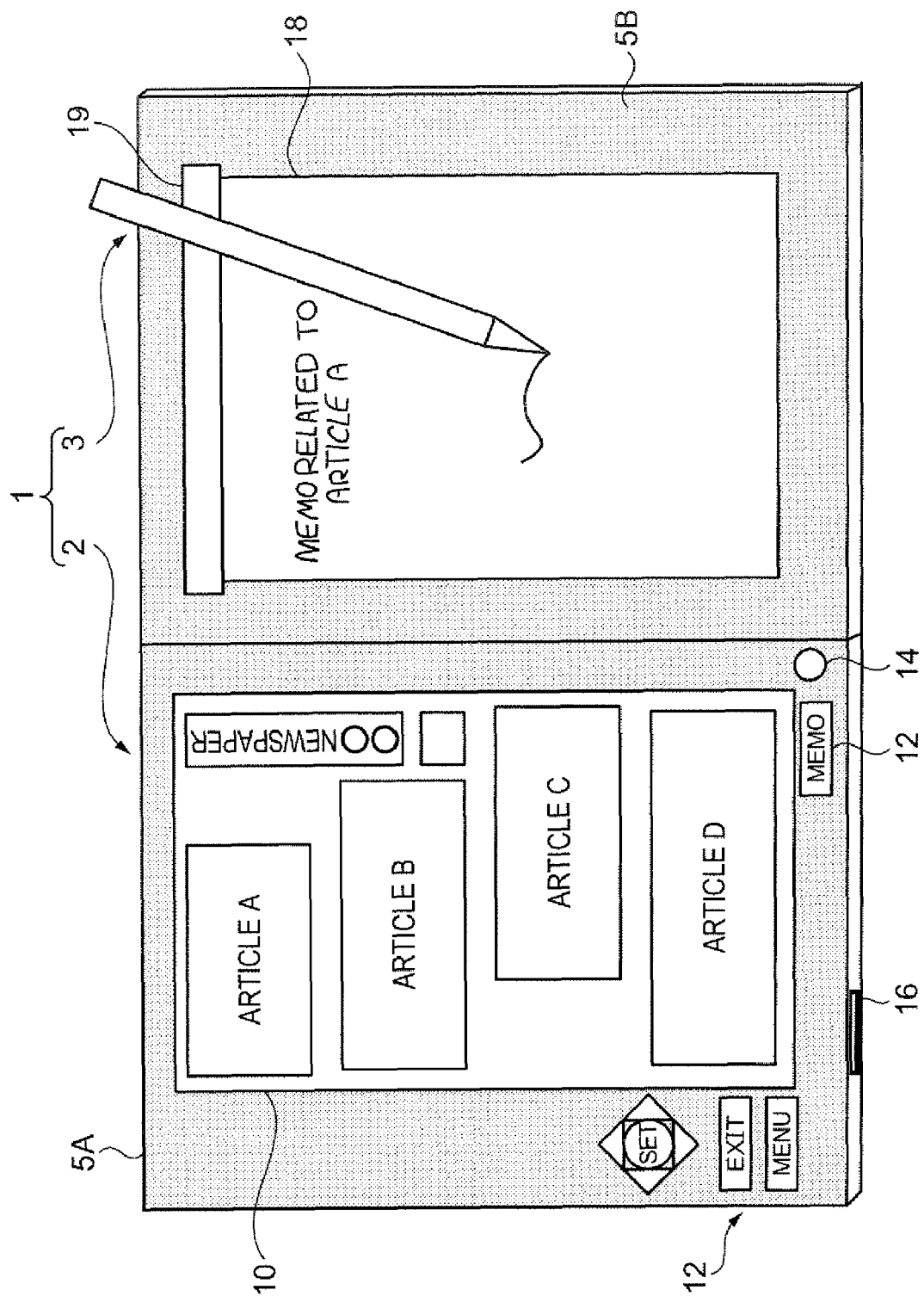
FIG. 1 is a diagram illustrating the outward appearance of an information display system according to an embodiment of the invention.

FIG. 1 is a diagram illustrating the outward appearance of the information display system 1 according to the embodiment of the invention. The information display system 1 includes an information display apparatus 2 for displaying information such as content, and a position indicating apparatus 3 for defining the position of the information display apparatus 2.

In the information display apparatus 2, a first case 5A is openably connected to a second case 5B. An electronic paper 10, operating buttons 12, a communication interrupt switch 14 are provided inside the first case 5A. In addition, a memory card reader 16 into which a memory card can be inserted is provided in the bottom surface of the first case 5A. A fixing member 19 is provided in the second case 5B. In addition, an input sheet 18 is arranged along the inner surface of the second case 5B, and one end of the input sheet 18 is fixed by the fixing member 19. A two-dimensional pattern in which positional coordinates on the input sheet 18 are encoded is printed on the surface of the input sheet 18. A method of reading the pattern formed on a medium, such as the input sheet, to calculate positional coordinates on the medium is disclosed in JP-T-2003-511761.

The position indicating apparatus 3 has a pen shape in appearance, and an area sensor 42 (FIG. 2) for reading the two-dimensional pattern on the input sheet 18 and a contact detecting switch 44 (FIG. 2) for detecting contact with the input sheet 18 are provided at the leading end of the position indicating apparatus 3. Also, the position indicating apparatus 3 has a function of discharging ink from the leading end, similar to a pen. Therefore, when a user draws a character on the input sheet 18 with the position indicating apparatus 3, information on the movement of the position indicating apparatus 3 is time-serially read by the area sensor 42, and the trance of the position indicating apparatus 3 remains on the input sheet 18 as the character drawn by the discharged ink.

Figure 2:
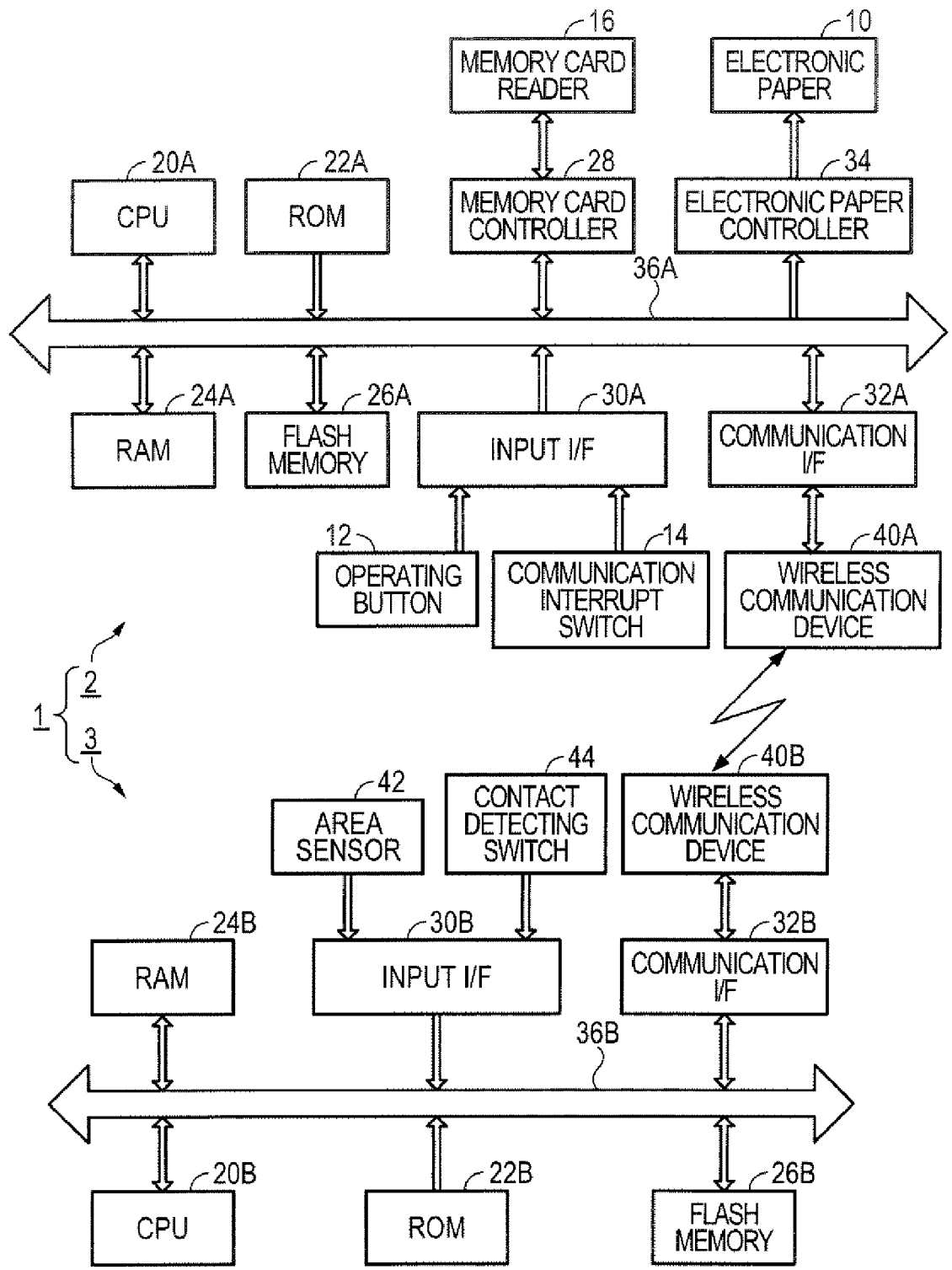
FIG. 2 is a diagram illustrating the hardware structure of the information display system according to the embodiment of the invention.

FIG. 2 is a diagram illustrating the hardware structure of the information display system 1. First, the hardware structure of the information display apparatus 2 will be described. The information display apparatus 2 includes a CPU 20A, a RAM 24A, a flash memory 26A, a ROM 22A, a memory card controller 28, an electronic paper controller 34, an input I/F 30A, and a communication I/F 32A. These hardware components are connected to one another by a bus 36A so that they can receive or transmit signals. These hardware components are managed by a predetermined operating system (OS), and execute predetermined functions by various software components including drivers that are stored in the ROM 22A and the flash memory 26A.

The CPU 20A reads various programs, such as basic software and device drivers for peripheral apparatuses connected to the information display system 1, and various data, such as content, from the ROM 22A and the flash memory 26A, and extends the programs and the data in a main memory area of the RAM 24A.

An electronic paper 10 is connected to the electronic paper controller 34, and the electronic paper controller 34 displays images, such as content, on the electronic paper 10 according to the instruction of the CPU 20A. The electronic paper 10 is composed of a display device, such as a cholesteric liquid crystal device or an electrophoresis device, and has a storing property which hold displayed content even when the supply of power is cut off.

The memory card reader 16 is connected to the memory card controller 28. When a memory card having content stored therein is inserted into the memory card reader 16, the memory card controller 28 reads out content information from the memory card.

A wireless communication device 40A is connected to the communication I/F 32A, and the communication I/F 32A transmits or receives information between the wireless communication device 40A and a wireless communication device 40B of the position indicating apparatus 3, which will be described later. In addition, the operating buttons 12 and the communication interrupt switch 14 are connected to the input I/F 30A according to a predetermined standard. The communication interrupt switch 14 is composed of a contact detecting sensor, and detects the contact between the input sheet 18 and the leading end of the position indicating apparatus 3. Although not shown in the drawings, the two-dimensional pattern is printed on the surface of the communication interrupt switch 14 such that the communication interrupt switch can start communication with the position indicating apparatus 3.

Next, the hardware structure of the position indicating apparatus 3 will be described. The position indicating apparatus 3 includes a CPU 20B, a RAM 24B, a flash memory 26B, a ROM 22B, an input I/F 30B, and a communication I/F 32B. These hardware components are connected to one another by a bus 36B so that they can receive or transmit signals. These hardware components are managed by a predetermined operating system (OS), and execute predetermined functions by various software components including drivers that are stored in the ROM 22B and the flash memory 26B. The functions of these hardware components are the same as those of the hardware components in the information display apparatus 2, and thus a description thereof will be omitted.

The area sensor 42 and the contact detecting switch 44 are connected to the input I/F 30B. The area sensor 421 is composed of a charge-coupled device (CCD), and acquires a predetermined two-dimensional image. The contact detecting switch 44 is composed of a contact detecting sensor, and detects the contact between the input I/F 30B and the communication interrupt switch 14 of the information display apparatus 2.

The wireless communication device 40B is connected to the communication I/F 32B, and transmits/receives information to/from the wireless communication device 40A of the information display apparatus 2. The wireless communication devices 40A and 40B perform communication by modulating a radio wave or light used as a carrier wave.

Figure 3:
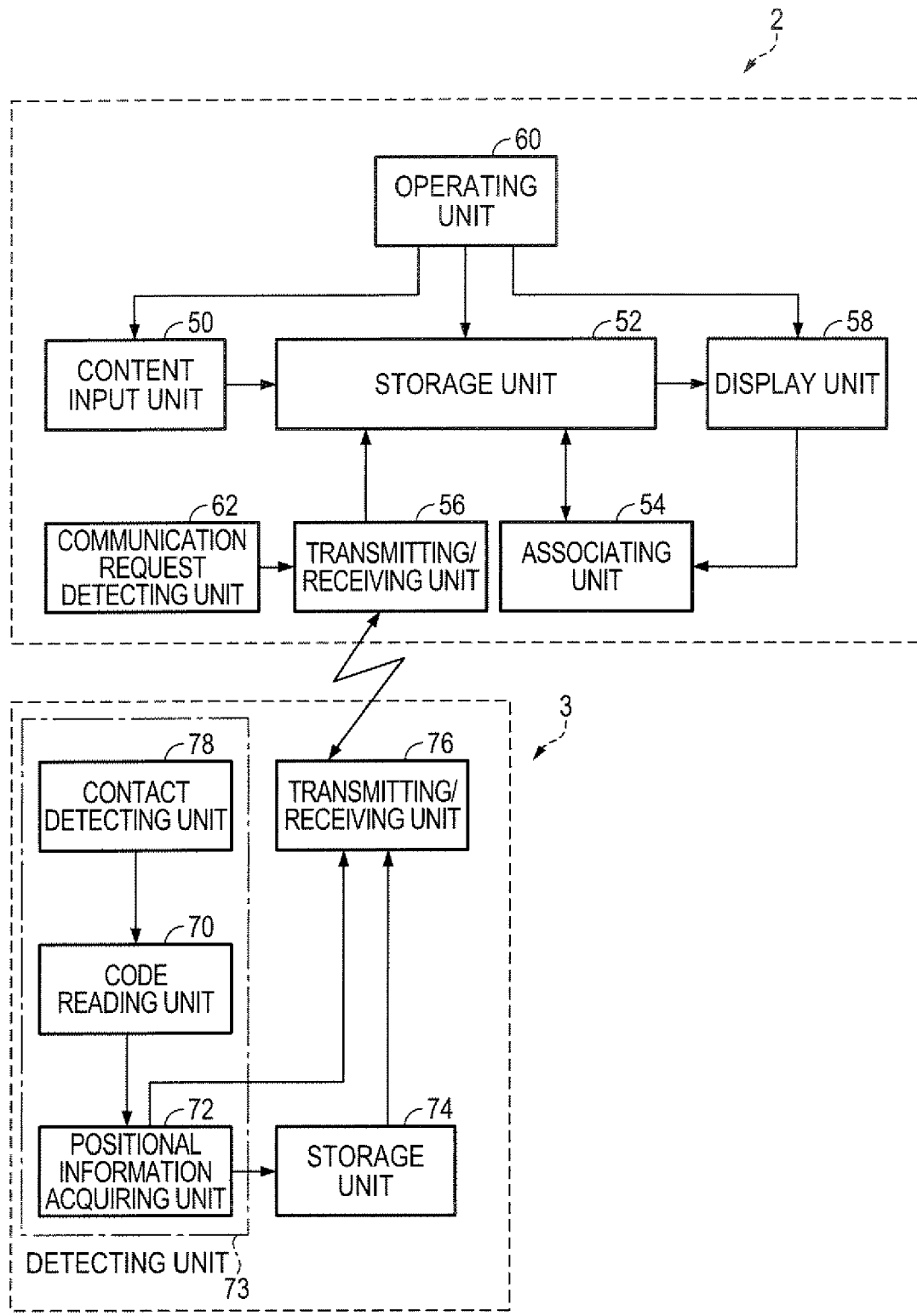
FIG. 3 is a diagram illustrating the functional structure of the information display system according to the embodiment of the invention.

FIG. 3 is a diagram illustrating the functional structure of the information display system 1. The position indicating apparatus 3 includes a detecting unit 73, a storage unit 74, and a transmitting/receiving unit 76. The information display apparatus 2 includes a content input unit 50, a storage unit 52, an associating unit 54, a transmitting/receiving unit 56, a display unit 58, an operating unit 60, and a communication request detecting unit 62.

First, the functions of the components of the position indicating apparatus 3 will be described below. The detecting unit 73 has a function of detecting an indicated position, and includes a contact detecting unit 78, a code reading unit 70, and a positional information acquiring unit 72. The contact detecting unit 78 detects the contact of the leading end of the position indicating apparatus 3 with the input sheet through the contact detecting switch 44 provided at the leading end of the position indicating apparatus 3. Information on the contact is transmitted to the code reading unit 70.

The code reading unit 70 receives the information on the contact from the contact detecting unit 78 and reads a two-dimensional pattern from the area sensor 42. When the read two-dimensional pattern is positional information, the read information is transmitted to the positional information acquiring unit 72. When the read two-dimensional pattern is a pattern printed to the communication interrupt switch 14 of the information display apparatus 2, that is, information indicating the start of communication, the positional information acquiring unit 72 instructs the transmitting/receiving unit 76 to establish communication with the information display apparatus 2.

The positional information acquiring unit 72 acquires positional information among the information transmitted from the code reading unit 70. More specifically, the positional information acquiring unit 72 decodes a code represented by the two-dimensional pattern to acquire coordinates of a position on the input sheet 18. The acquired coordinate data is transmitted to the storage unit 74.

The storage unit 74 stores the coordinate data transmitted from the positional information acquiring unit 72. More specifically, the storage unit 74 sequentially stores the coordinate data in a predetermined area of the flash memory 26B, and transmits a coordinate data group stored in the storage unit 26B to the transmitting/receiving unit 76 at the request of the transmitting/receiving unit 76. The coordinate data group transmitted to the transmitting/receiving unit 76 is deleted from the storage unit 74.

The transmitting/receiving unit 76 establishes communication with the information display apparatus 2 according to the instruction from the code reading unit 70. In addition, when the communication is established, the transmitting/receiving unit 76 acquires the coordinate data stored in the storage unit 74 and transmits the acquired coordinate data to the information display apparatus 2.

Next, the functions of the components of the information display apparatus 2 will be described below. Data for content to be displayed on the information display apparatus 2 is input to the content input unit 50. More specifically, data for content is read out from the memory card inserted into the memory card reader 16, and the read data for content is transmitted to the storage unit 52.

The storage unit 52 stores the data for content transmitted from the content input unit 50 and also stores information association transmitted from the associating unit 54, which will be described later. The data for content and the information on association stored in the storage unit 52 are managed by a content page table 100 (FIG. 6) and a page management table 102 (FIG. 6), respectively, which will be described later.

The display unit 58 displays, on the electronic paper 10, content selected from the contents stored in the storage unit 52 by the operating unit 60, which is composed of the operating buttons 12. The display unit 58 interpolates the coordinate data groups associated with each other by the associating unit 54, which will be described later, into a straight line or a curved line, and displays the interpolated line. As a result, for example, when the coordinate data groups are discrete data indicating characters or figures, the data groups are displayed on the display unit 58 such that they can be discriminated as characters or figures.

The communication request detecting unit 62 detects whether the position indicating apparatus 3 requests the establishment of communication. More specifically, when the leading end of the position indicating apparatus 3 comes into contact with the communication interrupt switch 14, the communication request detecting unit 62 instructs the transmitting/receiving unit 56 to establish communication with the position indicating apparatus 3.

The transmitting/receiving unit 56 establishes communication with the transmitting/receiving unit 76 of the position indicating apparatus 3 according to the instruction from the communication request detecting unit 62. When the communication is established, the transmitting/receiving unit 56 sequentially receives the coordinate data groups, and the received coordinate data groups are transmitted to the storage unit 52.

The associating unit 54 associates the coordinate data group stored in the storage unit 52, that is, positional information with the content displayed on the display unit 58. More specifically, the associating unit 54 stores address information indicating an area of the storage unit 52 having the coordinate data group stored therein and address information indicating another area of the storage unit 52 having the content page displayed on the display unit 58 stored therein such that the address information items are associated with each other. The association will be described in detail later.

Although the functions of the components of the information display system 1 have been described above, the functions are realized by organic cooperation between the hardware source and software.

Figure 4:
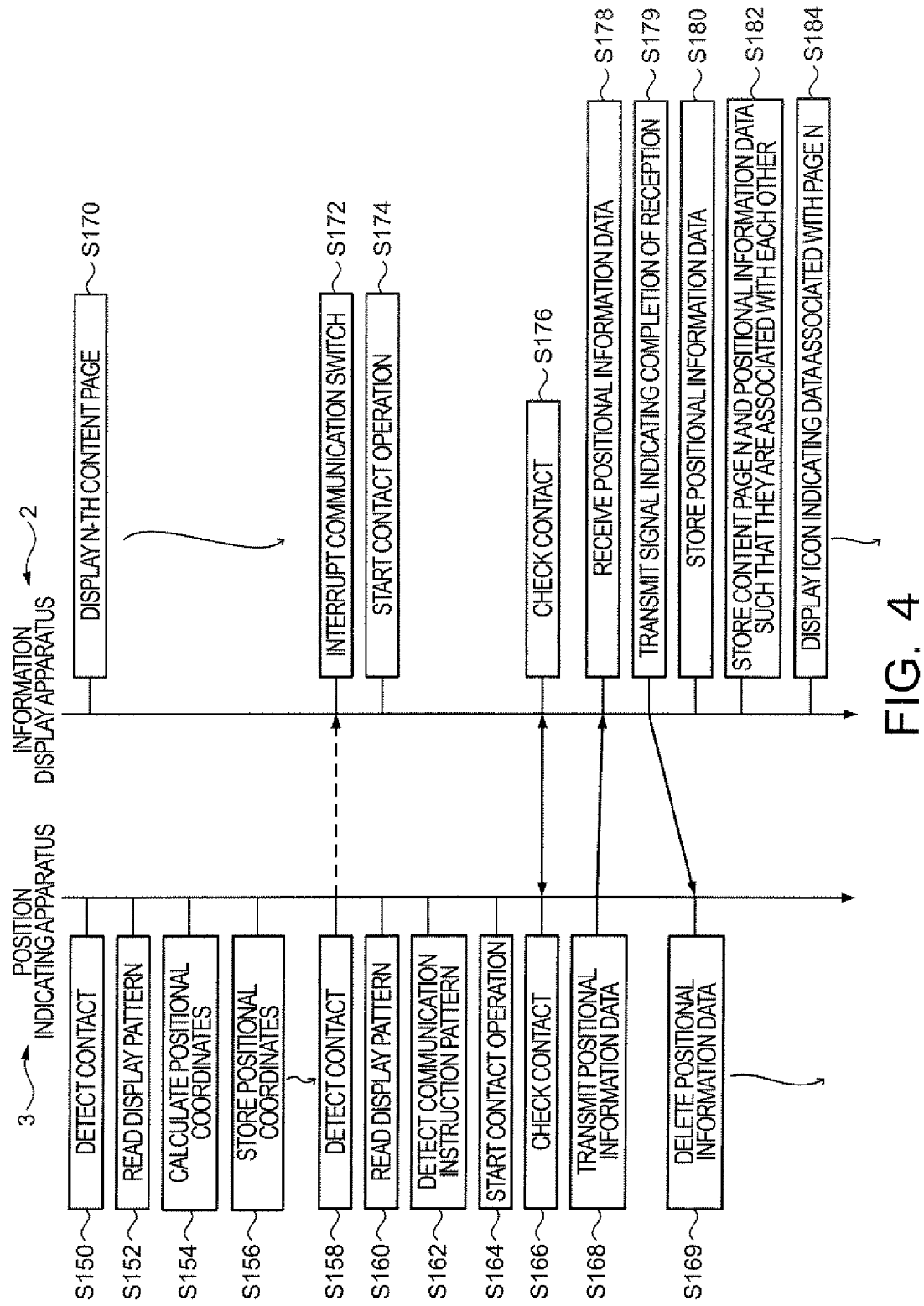
FIG. 4 is a timing chart illustrating the flow of an associating process of the information display system according to the embodiment of the invention.
Figure 5:
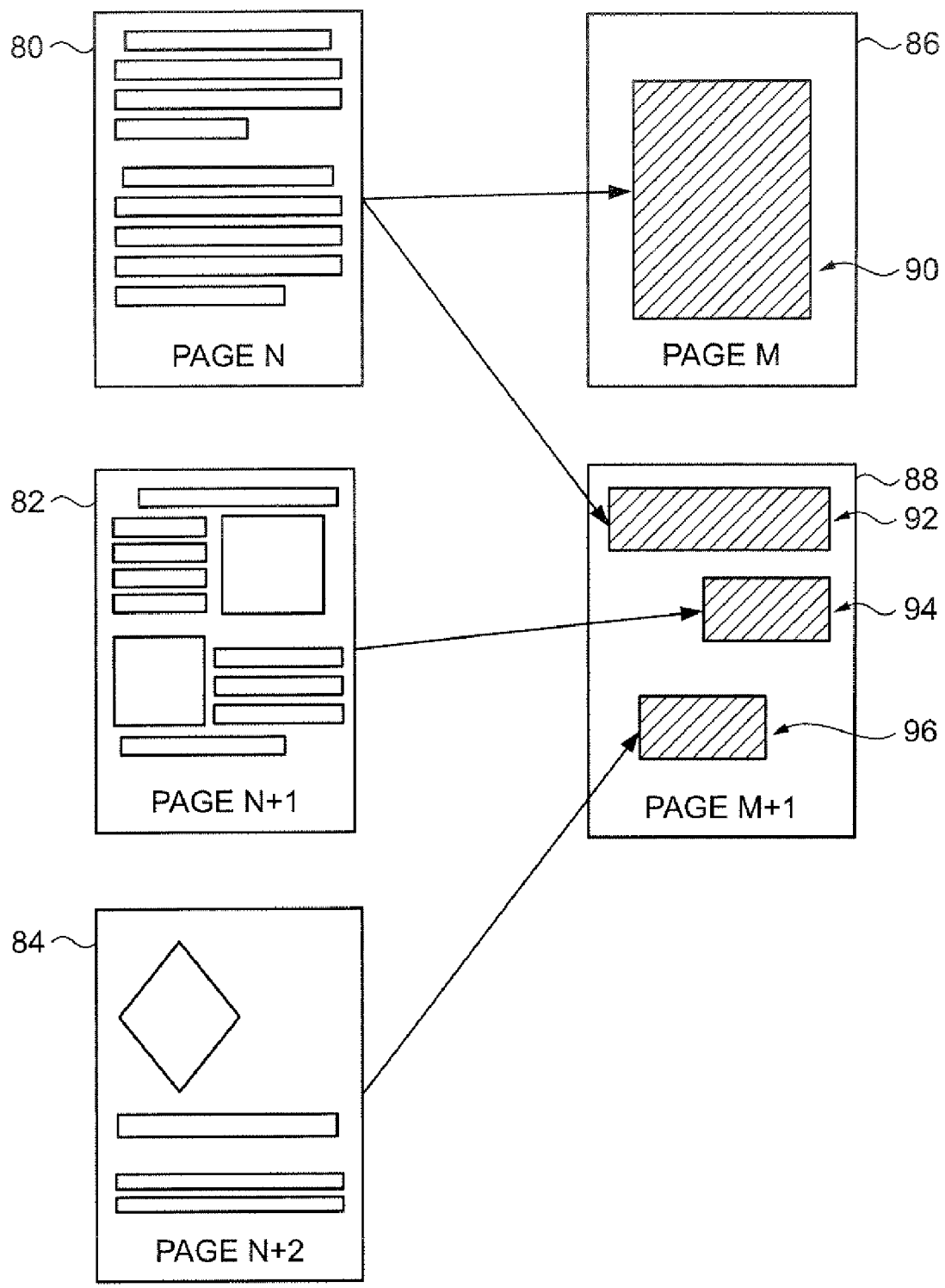
FIG. 5 is a diagram illustrating association for every content page.
Figure 6:
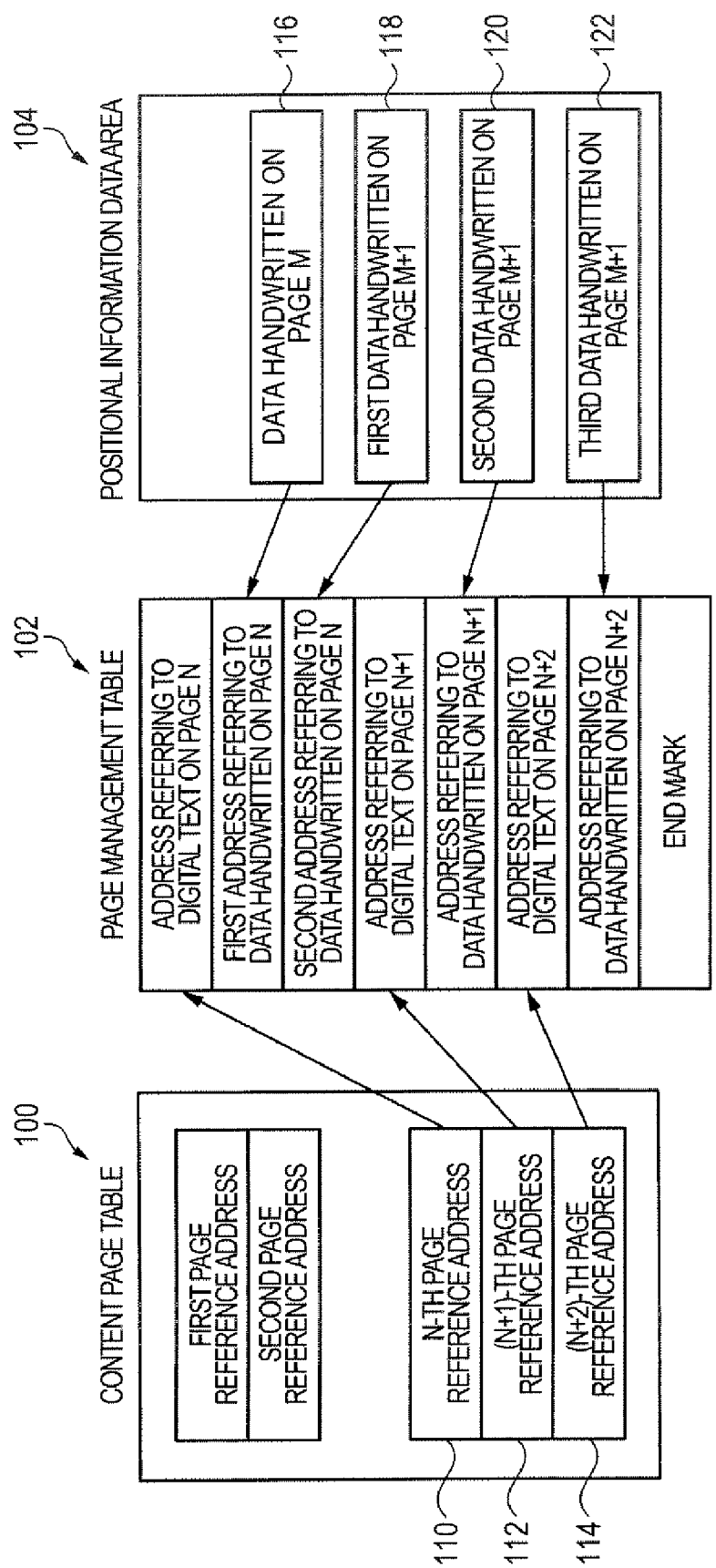
FIG. 6 is a diagram illustrating the relationship between information items associated with each other.

FIG. 4 is a timing chart illustrating the flow of the associating process in the information display system 1 and will be described with reference to the drawing. FIG. 5 is a diagram illustrating the association between content pages FIG. 6 is a diagram illustrating the relationship between information items associated with each other. For the purpose of simplicity of explanation and understanding, a description will be made with reference to FIGS. 5 and 6.

First, an N-th content page 80 is displayed on the display unit 58 of the information display apparatus 2 (step S170).

A user holds the position indicating apparatus 3 and brings the leading end of the position indicating apparatus 3 into contact with the input sheet 18 to draw a predetermined character on the input sheet 18. Then, the contact detecting unit 78 detects the contact of the position indicating apparatus 3 with the input sheet 18 (step S150).

Next, the code reading unit 70 receives information on the detection of the contact detecting unit 78 and reads a pattern displayed on the input sheet 18 (step S152).

Subsequently, the positional information acquiring unit 72 decodes the read pattern to calculate the coordinates of the position (step S154).

Then, the calculated positional coordinates are stored in the storage unit 74 (step S156). Whenever the user draws information related to a desired character or figure on the input sheet 18, the above-mentioned processes (steps S150 to 156) are repeated. As a result, coordinate data groups indicating a first information item 90 (FIG. 5) input by hand and a second information item 92 (FIG. 5) input by hand are generated, and the coordinate data groups are stored in the storage unit 74. However, in this embodiment of the invention, these information items 90 and 92 input by hand are managed in the unit of pages. Therefore, the first information item 90 input by hand and the second information item 92 input by hand are inserted into an M-th positional information page 86 and an (M+1)-th positional information page 88, respectively.

Subsequently, when the user brings the contact detecting switch 44 provided at the leading end of the position indicating apparatus 3 into contact with the communication interrupt switch 14, the contact detecting unit 78 of the position indicating apparatus 3 detects the contact (step S158).

Then, the code reading unit 70 receives information on the detection of the contact detecting unit 78 and reads a pattern displayed on the input sheet 18 (S160).

Successively, the code reading unit 70 determines whether the read pattern is a pattern indicating the start of communication (step S162).

Then, the transmitting/receiving unit 76 starts a connection operation to the information display apparatus 2 by communication (step S164).

When the information display apparatus 2 receives information indicating that the contact detecting switch 44 provided at the leading end of the position indicating apparatus 3 comes into contact with the communication interrupt switch 14, the communication request detecting unit 62 generates communication interrupt (step S172).

Then, the transmitting/receiving unit 56 starts a connection operation to the position indicating apparatus 3 by communication (step S174).

The connection between the transmitting/receiving unit 56 of the information display apparatus 2 and the transmitting/receiving apparatus 76 of the position indicating apparatus 3 is established according to a predetermined communication protocol (steps S166 and S176).

Subsequently, the coordinate data group indicating positional information stored in the storage unit 74 of the position indicating apparatus 3 is transmitted from the transmitting/receiving unit 76 (step S168).

The transmitted coordinate data group is received by the transmitting/receiving unit 56 of the information display apparatus 2 (step S178).

Then, a signal indicating that the coordinate data group is normally received is transmitted to the position indicating apparatus 3 (step S179).

When the signal is received, the coordinate data group stored in the storage unit 74 of the position indicating apparatus 3 is deleted (step S169). Then, the position indicating apparatus 3 is a standby state.

The coordinate data group received by the transmitting/receiving unit 56 of the information display apparatus 2 is stored in a positional information data area 104 (FIG. 6) of the storage unit 52 (step S180). More specifically, the coordinate data groups indicating the first information item 90 input by hand and the second information item 92 input by hand are stored in the positional information data area 104 as data 116 handwritten on the M-th page and first data 118 handwritten on the (M+1)-th page. However, in this embodiment, handwritten data is created in the positional information data area 104 such that, in the (M+1)-th page 88 of the same positional information, only target information is highlighted to be readably displayed and information items other than the target information are displayed in a light color or in a small size. For example, in the first data 118 handwritten on the (M+1)-th page, only the second information item 92 input by hand is readably displayed. In the second data 120 handwritten on the (M+1)-th page, only a third information item 94 handwritten on the (M+1)-th page is readably displayed. Similarly, in the third data 122 handwritten on the (N+1)-th page, only a fourth information item 96 handwritten on the (M+1)-th page is readably displayed.

Subsequently, an N-th content page 80 displayed on the display unit 58 and the coordinate data group indicating positional information are stored such that they are associated with each other (step S182). That is, data on the page management table 102 indicating the order in which content is displayed on the display unit 58 is rearranged such that a predetermined content page is displayed, followed by the page of associated handwritten data. More specifically, the associating unit 54 searches an N-th page reference address 110 that indicates a head address having the N-th content page 80 stored therein from the content page table 100. In addition, the associating unit 54 acquires a head address of the data 116 handwritten on the M-th page and a head address of the first data 118 handwritten on the (M+1)-th page that are associated with the N-th content page 80, and sequentially writes these head addresses in the next area of an N-th page reference address of the page management table 102 such that the N-th page is displayed, followed by the M-th page and the (M+1)-th page.

Finally, the display unit 58 displays an icon 97 (FIG. 7) indicating the existence of the associated data on a portion of the N-th content page 80 being currently displayed (step S184) and goes to a standby state.

The above-mentioned processes are repeated to associate an (N+1)-th content page 82 and an (N+2)-th content page 84 with the third information item 94 input by hand and the fourth information item 96 input by hand, respectively. However, similar to the second information item 92 input by hand, the third information item 94 input by hand and the fourth information item 96 input by hand are inserted into an (M+1)-th positional information page 88. In this case, data in the positional information data area 104 associated with the (N+1)-th content page 82 is the second data 120 handwritten on the (M+1)-th page. The head address of the second data 120 handwritten on the (M+1)-th page is written to the next area of an (N+1)-th page reference address 112 of the page management table 102. Similarly, data in the positional information data area 104 associated with the (N+2)-th content page 84 is the third data 122 handwritten on the (M+1)-th page. The head address of the third data 122 handwritten on the (M+1)-th page is written to the next area of an (N+2)-th page reference address 114 of the page management table 102.

Figure 7:
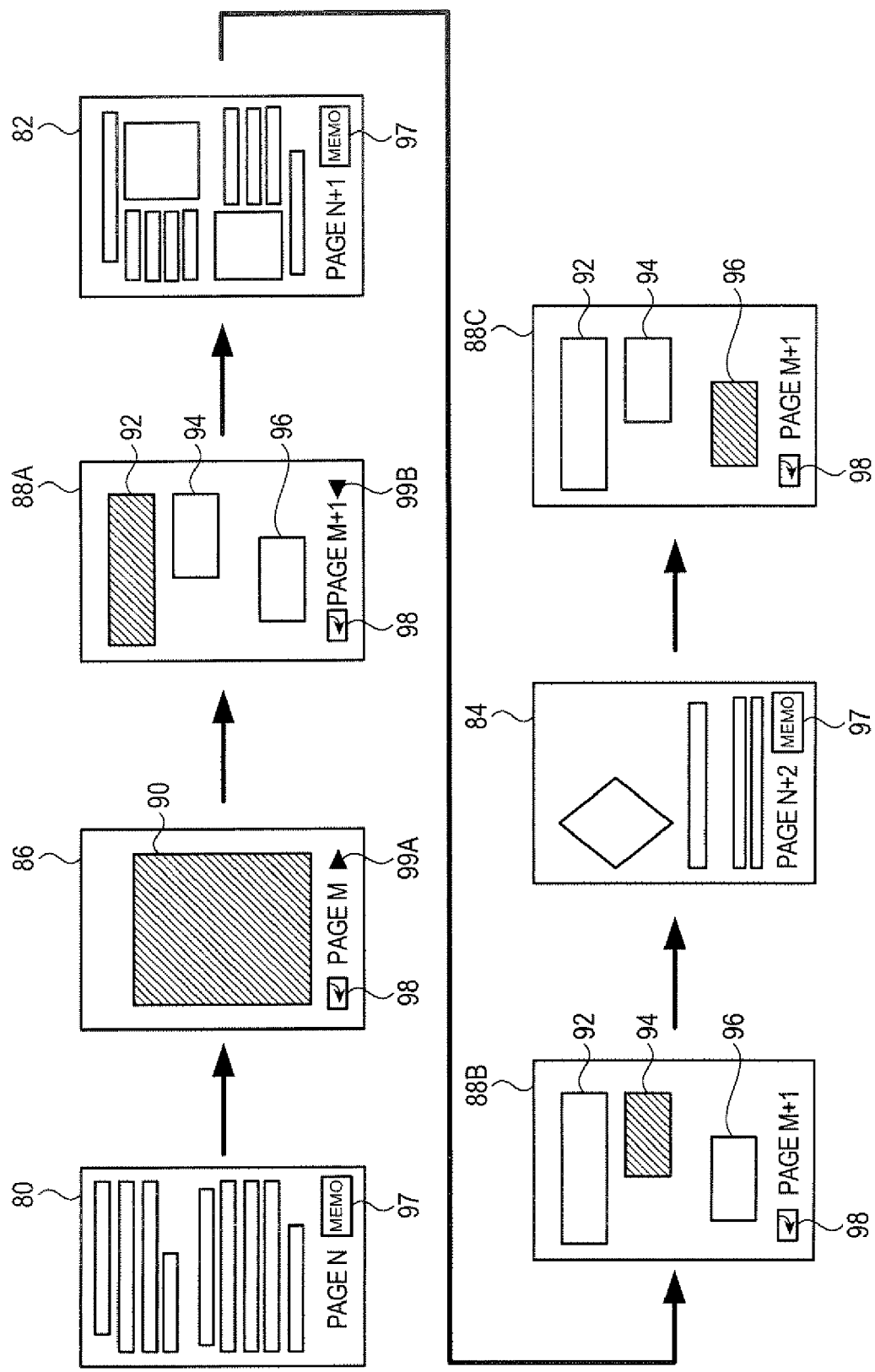
FIG. 7 is a diagram illustrating the display of information associated with content.

FIG. 7 is a diagram illustrating the display of information associated with content performed by the above-mentioned process. The display of information will be described with reference to FIGS. 6 and 7. First, when the user operates the operating button 12, the N-th content page 80 is displayed on the electronic paper 10. The icon 97 indicating the existence of the associated data is also displayed in the page. When the operating button 12 for displaying associated information is pushed, the M-th positional information page 86 that is written to the page management table 102 so as to be displayed following the N-th content page 80 is displayed on the electronic paper 10, and the first handwritten information item 90 that is inserted into the M-th positional information page 86 is readably displayed. An icon 99A indicating the existence of associated data and an icon 98 for returning to the content page are displayed on the page. When the operating button 12 corresponding to the icon 98 for returning to the content page is pushed, the N-th content page 80 is displayed.

When the operating button 12 for displaying associated information is pushed, an (M+1)-th positional information page 88A that is written to the page management table 102 so as to be displayed following the M-th positional information page 86 is displayed on the electronic paper 10. In this case, only the second input information item 92 is readably displayed on the electronic paper 10, and the other information items 94 and 96 on the same page are displayed in a light color or in a small size. An icon 99B for returning to the previous associated data and the icon 98 for returning to the content page are displayed on the (M+1)-th positional information page 88A. When the operating button 12 corresponding to the icon 98 for returning to the content page is pushed, the N-th content page 80 is displayed. When the operating button 12 corresponding to the icon 99B for returning to the previous associated data is pushed, the M-th positional information page 86 is displayed on the electronic paper 10.

In the above-mentioned states, when the operating button 12 for displaying the next content page is pushed, the (N+1)-th content page 82 is displayed on the electronic paper 10. Similar to the N-th content page 80, the icon 97 indicating the existence of associated data is displayed on the same page. When the operating button 12 indicating associated information is pushed, an (M+1)-th positional information page 88B is displayed on the electronic paper 10. In this case, only the third input information item 94 is readably displayed on the electronic paper 10, and the other information items 92 and 96 on the same page are displayed in a light color or in a small size. In addition, the icon 98 for returning to the content page is displayed on the (M+1)-th positional information page 88B. When the operating button 12 corresponding to the icon 98 is pushed, the (N+1)-th content page 821 is displayed. When the operating button 12 for displaying the previous content page is pushed, the previous content page is displayed on the electronic paper 10. However, when the (N+2)-th content page 84 is displayed on the electronic paper 10, the same processes as described above are performed, and thus a description thereof will be omitted.

The above-described embodiment of the invention has the following effects.

(1) When the user draws a predetermined character or figure with the position indicating apparatus 3, positional information on the character or figure is stored in the storage unit 74, and the ink discharging function provided at the leading end of the position indicating apparatus 3 causes the trace of the position indicating apparatus 3 to remain on the input sheet 18 as an inkstain. Therefore, it is possible to use the character or figure written on the input sheet by the user as a straight record.

(2) Positional information on the movement of the position indicating apparatus 3 is displayed on different pages without being superposed on one content page displayed on the electronic paper 10. Therefore, it is possible to prevent the rewriting of a character or a figure on the electronic paper 10 due to a delay in the drawing speed and thus to improve the convenience of the information display apparatus 2.

Although the embodiment of the invention has been described above, the invention is not limited thereto. For example, the following modifications of the invention can be made.

(1) In the above-described embodiment, in the information display apparatus 2, the first case 5A is openably connected to the second case 5B, but the invention is not limited thereto. For example, the first case 5A may be separated from the second case 5B.

(2) In the above-described embodiment, the code reading unit 70 reads a two-dimensional pattern code printed on the input sheet 18, but the invention is not limited thereto. For example, when an electronic pen moves on a sheet arranged on an electromagnetic-induction-type tablet or a pressure-sensitive tablet, a code corresponding to a signal output from the electronic pen according to an indicated position may be read from a variation in pressure or an electromagnetic wave.

The entire disclosure of Japanese Patent Application No. 2005-353032, filed Dec. 7, 2005 is expressly incorporated by reference herein.

What is claimed is:

1. An information display system comprising:
a position indicating apparatus that indicates a position of a tip thereof on an input sheet during writing of a first memorandum as an indicated position; and
an information display apparatus that displays information and communicates with the position indicating apparatus,
wherein the position indicating apparatus includes:
a detecting unit that detects the indicated position as a detected position;
a first storage unit that stores the detected position as a stored position; and
a transmitting unit that transmits positional information indicating the stored position, and
the information display apparatus includes:
a display unit that displays content on a content page that is without the first memorandum, the display unit displays the first memorandum on a memorandum page that is without the content;
a receiving unit that receives the positional information from the transmitting unit;
an associating unit that associates the positional information with the content based on reference addresses of the positional information and the content and determines a sequence of the content and the positional information that have been associated with each other whereby the positional information directly follows the content displayed by the display apparatus when the first memorandum was written;
a second storage unit that stores the positional information and the content associated with each other, the second storage unit including:
a positional information data area that includes the positional information;
a content page table that includes data for the content; and
a page management table that includes the positional information and the content in the sequence determined by the associating unit; and
a display selector operable to change the display from the content page to the memorandum page upon selection thereof;
wherein the memorandum page includes the first memorandum, which is associated with the content, and a second memorandum, which is not associated with the content, wherein the associating unit is configured to associate a third memorandum written on the input sheet with the first content page including the first content, the first content is concurrently displayed as the third memorandum is written; and a second memorandum page including only the third memorandum; wherein the second memorandum page is displayed prior to the first memorandum page upon selection of the memorandum display button.

2. The information display system according to claim 1, wherein the display unit has a storage property that holds a display of the content when a supply of power is cut off.

3. The information display system according to claim 1, wherein the associating unit associates at least one content page with at least one positional information item.

4. The information display system according to claim 3, wherein the display unit displays a plurality of positional information items, and the display unit readably displays the positional information item associated with the at least one content page among the plurality of positional information items, and displays other positional information items that are not associated with the at least one content page in at least one of a light color and a small size.

5. The information display system according to claim 1, wherein a trace of the indicated position is time-serially indicated in the positional information.

6. The information display system according to claim 3, wherein the display unit displays together with the at least one content page an existence or nonexistence of the positional information item associated with the at least one content page.

7. The information display system of claim 1, wherein the display unit is an electronic paper display.

8. The information display system of claim 7, wherein the display unit includes one of a cholesteric liquid crystal display or an electrophoresis display.

9. The information display system of claim 1, wherein the input sheet is non-electronic.

10. The information display system of claim 1, wherein the position indicating apparatus is configured to dispense ink.

11. An information display system comprising:
an input sheet;
an electronic paper display spaced apart from the input sheet;
an associating unit configured to associate a first memorandum written on the input sheet by a user with a first content page including first content concurrently displayed on the display, the associating unit determines a storage sequence in which the first memorandum directly follows the first content page;
a storage unit including a page management table configured to store the first memorandum and the first content page in the sequence determined by the associating unit; and
a memorandum display button, selection of the button when the display is displaying the first content page sends a command to the information display system to display the first memorandum on a first memorandum page of the display;
wherein the first content page is different than the first memorandum page, the first content page does not include the first memorandum, and the first memorandum page does not include the first content; and
wherein the first memorandum page further includes a second memorandum that is not associated with the first content page, wherein the associating unit is configured to associate a third memorandum written on the input sheet with the first content page including the first content, the first content is concurrently displayed as the third memorandum is written; and a second memorandum page including only the third memorandum; wherein the second memorandum page is displayed prior to the first memorandum page upon selection of the memorandum display button.

12. The information display system of claim 11, wherein the display includes one of a cholesteric liquid crystal display or an electrophoresis display.

13. The information display system of claim 11, wherein the input sheet is non-electronic.

14. The information display system of claim 11, wherein the writing implement includes a storage unit for storing position information corresponding to movement of the writing implement with respect to the input surface prior to transmission of the position information to the display.

15. An information display system comprising:
a display operable to display a first content page including first content and a second content page including second content, the first content page is different than the second content page;
an input sheet spaced apart from the display;
a writing implement including a transmitter configured to transmit information corresponding to movement of the writing implement on the input sheet;
an associating unit configured to:
associate the first content with a first memorandum written on the input sheet with the writing implement when the first content page including the first content is displayed;
associate the second content with a second memorandum written on the input sheet with the writing implement when the second content page including the second content is displayed; and
provide a storage and display sequence whereby the first memorandum directly follows the first content and the second memorandum directly follows the second content;
a storage unit including a page management table configured to store the first content, the first memorandum, the second content, and the second memorandum in the sequence determined by the associating unit;
a first icon displayed on the first content page when the first memorandum is associated with the first content;
a second icon displayed on the second content page when the second memorandum is associated with the second content;
wherein upon selection of the first icon the display displays a first memoranda page including the first memorandum associated with the first content, the first memoranda page does not include content; and
wherein upon selection of the second icon the display displays a second memoranda page including the second memorandum associated with the second content, the second memoranda page does not include content;
wherein the associating unit is further configured to associate the first content with a third memorandum written on the input sheet with the writing implement when the first content page including the first content is displayed;
a third icon displayed on the first memoranda page when the third memorandum is associated with the first content;
wherein upon selection of the third icon the display displays a third memoranda page including the third memorandum, the third memoranda page does not include content.

16. The information display system of claim 15, wherein the writing implement is configured to discharge ink.

17. The information display system of claim 15, wherein the display includes electronic ink.

18. The information display system of claim 17, wherein the display includes one of a cholesteric liquid crystal display or an electrophoresis display.

19. The information display system of claim 15, wherein the input sheet is non-electronic.

20. The information display system of claim 15, wherein the first memoranda page includes a third memorandum that is not associated with the first content, the third memorandum is deemphasized as compared to the first memorandum that is associated with the first content.

21. The information display system of claim 15, wherein the third memoranda page includes a fourth memorandum not associated with the first content, the fourth memorandum is deemphasized on the display as compared to the third memorandum; and
wherein the first memoranda page includes only the first memorandum.

* * * * *